United States Patent
Gallagher, Jr. et al.

(10) Patent No.: US 6,171,431 B1
(45) Date of Patent: *Jan. 9, 2001

(54) WELDED FABRIC SEAMS WITH INNER AND OUTER TABS

(76) Inventors: Joseph E. Gallagher, Jr., 5944 Mechanicsville Rd., Mechanicsville, PA (US) 18934; John J. McGraw, 7146 Tuliptree Trail, Indianapolis, IN (US) 46256

( * ) Notice: Under 35 U.S.C. 154(b), the term of this patent shall be extended for 0 days.

This patent is subject to a terminal disclaimer.

(21) Appl. No.: 09/093,108

(22) Filed: Jun. 8, 1998

Related U.S. Application Data

(63) Continuation-in-part of application No. 08/697,648, filed on Aug. 27, 1996, now Pat. No. 5,766,400.

(51) Int. Cl.[7] ................................................. B32B 31/00
(52) U.S. Cl. ........................ 156/251; 156/267; 156/269; 156/275.1; 156/290; 156/308.4
(58) Field of Search ..................... 156/251, 267, 156/269, 272.2, 275.1, 290, 308.4, 510, 515, 549

(56) References Cited

U.S. PATENT DOCUMENTS

| | | | |
|---|---|---|---|
| 3,656,594 | 4/1972 | Marks et al. | 16/126 |
| 4,135,957 | 1/1979 | Voller | 156/157 |
| 4,469,744 | 9/1984 | Grot et al. | 428/246 |
| 4,545,841 | 10/1985 | Jackrel | 156/290 |
| 4,574,173 | 3/1986 | Bennett | 219/10.53 |
| 4,643,791 | 2/1987 | Jurrius et al. | 156/251 |
| 4,804,432 | * 2/1989 | Jurrius et al. | 156/350 |
| 4,831,667 | 5/1989 | Town | 2/163 |
| 4,847,918 | 7/1989 | Sturm | 2/161.6 |
| 4,943,475 | 7/1990 | Baker et al. | 428/246 |
| 5,024,594 | 6/1991 | Athayde et al. | 4258/246 |
| 5,036,551 | 8/1991 | Dailey et al. | 2/167 |
| 5,123,119 | 6/1992 | Dube | 2/168 |
| 5,133,344 | 7/1992 | Jurrius et al. | 128/201.23 |
| 5,234,523 | 8/1993 | Battreal | 156/283 |
| 5,235,713 | 8/1993 | Guthrie et al. | 5/453 |
| 5,244,525 | * 9/1993 | Neuwirth et al. | 156/251 |
| 5,294,258 | 3/1994 | Jarrell et al. | 118/410 |
| 5,336,346 | 8/1994 | Meltzer et al. | 156/73.4 |
| 5,348,604 | 9/1994 | Neff | 156/272.8 |
| 5,349,166 | 9/1994 | Taylor | 219/643 |
| 5,366,801 | 11/1994 | Bryant et al. | 442/131 |
| 5,402,540 | 4/1995 | Williams | 2/239 |
| 5,484,645 | 1/1996 | Lickfield et al. | 428/198 |
| 5,494,736 | 2/1996 | Willey et al. | 428/288 |
| 5,543,604 | 8/1996 | Taylor | 219/643 |
| 5,569,507 | 10/1996 | Goodwin et al. | 428/76 |
| 5,700,544 | * 12/1997 | Goodwin et al. | 428/76 |
| 5,766,400 | * 6/1998 | Gallagher, Jr. | 156/251 |

FOREIGN PATENT DOCUMENTS 0562703   12/1994   (JP) .

* cited by examiner

Primary Examiner—James Sells

(57) ABSTRACT

A prefabricated multi-layered flexible product which can be used as a liner for an outer shell or as a stand-alone product. A substrate fabric material is placed in parallel with a synthetic film membrane to form a two ply laminate, and with outer substrate fabric material(s) to form multi-ply laminates. A thermoplastic film is strategically placed in between the layers to enhance bonding. The laminate(s) and/or separate sheets of above materials are assembled by using a radio frequency welding process and then out into two or three dimensional forms, which in their bonded state form either a prefabricated component liner or a prefabricated stand-alone product. The form may be a glove, sock, shirt, boot/shoe, hat, jacket, pant, etc.

14 Claims, 2 Drawing Sheets

WELDED FABRIC SEAMS WITH INNER AND OUTER TABS

CROSS REFERENCE TO RELATED APPLICATION

This application is a continuation-in-part of U.S. Ser. No. 08/697,648 filed Aug. 27, 1996, now U.S. Pat. No. 5,766,400.

FIELD OF THE INVENTION

This invention relates to the fabrication of waterproof, waterproof/breathable, windproof (with or without vapor permeable/moisture vapor transfer) apparel involving a post- or a pre-lamination process in order to provide a water tight seam. More specifically, this invention teaches the formation of welded fabric seams with inner and outer positioning tabs on either side of the seam for attachment inside and outside of the seams.

BACKGROUND OF THE INVENTION

To date liners for apparel and footwear have been assembled by the stitch and seam method whereby two layers are joined by a stitch pattern creating a seam. Waterproofing the seam was accomplished by taping and gluing the seam. However taped and glued, stitched seams tend to fail when subjected to stress from repeated use.

U.S. Pat. No. 4,847,918 issued to Sturm discloses a flexible fire retardant and heat insulating glove that is mounted within and cemented to a flexible, water tight, vapor permeable plastic glove. A flexible reinforcement element having the outline of the plastic glove, with fingers somewhat longer than the fingers of the plastic glove, is cemented to one face of the plastic glove in substantial registry therewith. The fingers of the reinforcement element were extended beyond the fingers of the plastic glove to provide securement tabs. These securement tabs are stitched or tacked to the tips of the fingers of a reversed leather glove and reinforcement element.

U.S. Pat. No. 5,036,551 issued to Daily et al. concerns elastomeric composite fabrics which have a layered construction and are made of a microporous polymeric membrane, water vapor permeable polymer, and an elastomeric thermoplastic non-woven material. The elastomeric composite fabrics provide barrier properties with water vapor permeability and find utility in articles which conform about another object.

U.S. Pat. No. 5,123,119 issued to Dube concerns a two component, waterproof, breathable glove and the corresponding methods of forming the glove. A homogenous membrane in regard to its permeability characteristics is attached to a fabric. The membrane is tacky on one surface and wear resistant on the other surface. Using a contoured mold and foam forms, the layers for the inner liner are cut and are thermowelded or bonded together to form a three dimensional inner shell of a glove. Then the formed inner shell is attached to an outer glove shell by conventional methods.

U.S. Pat. No. 5,234,523 issued to Battreall discloses a method for laminating a gas permeable layer onto a preformed substrate by forming a laminate precursor comprising a substrate and a gas permeable layer in which a layer of adhesive is positioned between the gas permeable layer and a substrate surface. A layer of water is formed on the surface of the gas permeable layer and the wetted surface is contacted by a preheated platen and superheated steam is ejected onto the gas permeable layer causing the adhesive to cure and bond the gas permeable layer to the substrate.

U.S. Pat. No. 5,294,258 issued to Jarrel et al. concerns a breathable laminate which comprises at least two porous webs laminated together with a porous adhesive matrix, preferably a random fibrous adhesive pattern having a coat weight of between 1.5 and 12 grams per square meter. The two or more porous webs comprise woven or non-woven materials and the resulting breathable fabric or laminate has good hand flexibility. Breathable fabric is adhered to the foam by such random adhesive patterns of similar coat weights. Coating widths of up to 80 inches or more are produced in a slot die, with motors and pumps controlled to maintain consistent, uniform coat weights regardless of coat widths and substrate speeds selected.

U.S. Pat. No. 5,366,801 to Bryant et al. describes a coating which when applied to fabrics enhances the thermal characteristics of the coated fabric. The coating includes integral and leak-resistant microcapsules filled with phase change material or plastic crystals that have specific thermal properties at predetermined temperatures.

A disclosure of Toshiichi Osako describes an arctic glove comprised of a cloth material on the outside, waterproof materials in the middle layer and a woven or knit material on the inside. The three layers are bonded together with adhesives in a dotted state.

U.S. Pat. No. 5,569,507 to Goodwin et al. discloses a laminated seam with outer tabs formed by heat sealing a membrane-backed composite layer to itself with a continuous layer applied as a hot melt to a fabric front layer. The heat and pressure of the heat sealing is said to penetrate the fibers in the fabric of the composite with the adhesive to form a leakproof seal impenetrable by viruses.

There is no teaching or suggestion of obviousness in the prior art respecting the present invention method of producing a synthetic film membrane and substrate fabric laminate or an outer substrate fabric, substrate fabric and synthetic film membrane laminate for application as a liner for clothing and footwear as described herein. More particularly, there is no teaching or suggestion of utilizing the laminates disclosed herein in a manner which eliminates the need for any post-construction manufacturing techniques traditionally used, such as stitched seams which are taped and glued, for providing a waterproof, waterproof/breathable, windproof, or vapor permeable synthetic seal.

SUMMARY OF THE INVENTION

The present invention concerns a method of producing prefabricated, multi-layered flexible products which eliminates traditional post-construction techniques for clothing and apparel, which traditionally would have been a liner with a stitched seam which must be taped and glued for waterproof applications. However, in the present invention, a substrate fabric material is adhered to a synthetic film membrane in a two-ply laminate, and with outer substrate fabric material(s) in a multi-ply laminate. The sheets and/or laminate(s) are assembled by using a radio frequency welding process which employs a thermoplastic film, with or without adhesive properties, and then cut into two or three dimensional forms, which are parallel to each other so that when adhered together at the perimeter they form either a prefabricated component liner or a prefabricated stand alone product. Inner and outer positioning tabs are formed adjacent to the seam for attachment purposes. The form may be a glove, sock, shirt, boot/shoe, hat, jacket, pant, etc.

The present invention overcomes the problems of previous methods and products by providing a thermoplastic film, with or without adhesive properties, between the laminate(s) or sheets. In the case of a multi-ply product, the thermoplastic film, with or without adhesive properties, is also placed on the other side of the sheet(s) or laminate(s) to assist the sealing process. For example, for substrate materials that have inherent wicking capabilities, i.e., fleece, the outer surface(s) of the weld areas must have a thermoplastic film placed on them (as in the inside) to insure a waterproof seal. After the sealing is complete, the article is die and/or hand cut to form, and the excess film is removed, leaving a prefabricated component liner or stand alone product.

The positioning tabs are created during the seal and cut operations for the prefabricated component liner, and may then be used to adhere the outer shell and/or inner together at the tab location(s). In the case of a prefabricated stand alone product the tabs are used to attach peripheral components, i.e., cuff(s), strap(s), zipper(s), etc.

Broadly, the invention provides a method for producing a multi-layered flexible product. The method includes the sequential steps of: (a) cutting out a thermoplastic joiner film along an inner edge of a pattern of a seam to be made with the joiner film, (b) positioning the joiner film between parallel top and bottom fabric sections, (c) welding the fabric sections and the joiner film together to form a seam along the pattern, and (d) removing excess joiner film from along an outer edge of the seam. The cutting out step (a) preferably forms a plurality of tabs which extend inwardly from the seam. The cutting step (d) preferably forms a plurality of tabs which extend outwardly of the seam. The thermoplastic joiner film can be a polyurethane, polyolefin or the like. The pattern is preferably in a shape selected from gloves, glove inserts, mittens, socks, boots, booties, boot inserts, shoes, shoe inserts, jackets, coveralls, masks, waders, equipment covers, bags, tubes, pouches, shirts, pants, and the like. Each fabric section preferably includes a fabric substrate layer and a synthetic film membrane. The synthetic film membranes can be fused adjacent the joiner film and the seam. The welding step (c) is preferably RF welding. The welding step (c) and the step (d) of removing excess joiner film can be trim bond welding, also known as tear seal welding or cut seal welding. The step (d) of removing the excess joiner film preferably includes cutting along an outer edge of the seam.

In one preferred embodiment, the present invention provides a method for making an apparel insert. The method includes the steps of: (a) cutting out a thermoplastic joiner film along an inner edge of an apparel pattern of a seam to be made with the joiner film, wherein the pattern includes a plurality of tabs which extend inwardly from the seam; (b) positioning the joiner film between parallel top and bottom fabric sections including a synthetic film membrane facing the joiner film and a fabric substrate layer away from the joiner film; (c) RF welding the fabric section and the joiner film together to form the seams along said pattern; and (d) cutting away the fabric sections and joiner film from an outer edge of the seam to form a plurality of tabs which extend outwardly of the seam. The apparel is preferably a glove or mitten.

The invention also provides a method for making a glove. The method for making the glove includes: (a) cutting out a thermoplastic joiner film along an inner edge of the glove pattern of a seam to be made with the joiner film, wherein the pattern includes a plurality of tabs which extend inwardly from the seam; (b) positioning the joiner film between parallel top and bottom fabric sections including a synthetic film membrane facing the joiner film and a fabric substrate layer away from the joiner film; (c) RF welding the fabric section and the joiner film together to form the seams along said pattern; (d) cutting away the fabric sections and joiner film from an outer edge of the seam to form a plurality of tabs which extend outwardly of the seam; (e) securing an inner glove liner to one set of the tabs; and (f) securing an outer glove shell to another set of the tabs.

In another aspect, the present invention provides a fabric construct having utility as an intermediate layer in a multilayer construction. The construct has first and second parallel fabric sections welded together on opposite sides of a parallel thermoplastic joiner film to form a seam. A plurality of tabs are formed in the joiner film extending from either side of the seam.

In a further aspect, the invention provides a fabric construct having utility as a glove insert between inner and outer shells of the glove. The fabric construct has first and second parallel fabric sections in the shape of a glove welded together on opposite sides of a parallel thermoplastic joiner film to form a seam at edges of the shape. A first set of tabs formed in the joiner film extends inwardly from the seam. A second set of tabs extends outwardly from the seam.

In a further aspect of the invention, there is provided a glove which includes an insert, an inner liner and an outer shell. The insert has first and second parallel fabric sections in the shape of a glove welded together on opposite sides of a parallel joiner film to form a seam at edges of the shape. The inner liner is inside the insert and secured to a first set of tabs formed in the joiner film and extending inwardly from the seam. The outer shell is secured over the insert to a second set of tabs formed in the joiner film and extending outwardly from the seam.

DETAILED DESCRIPTION OF THE INVENTION

The present invention is a method of producing prefabricated, multi-layered flexible products eliminating traditional post-construction techniques for clothing and apparel, such as producing a liner using sewn seams which must be taped and glued for waterproof application. In this invention, the method can be used to weld together laminates, which are produced through conventional means by adhering substrate fabric material to a synthetic film membrane, and/or separate sheets of substrate fabric material and synthetic film membrane to form the prefabricated multi-layered flexible product. Specifically, laminates can be of the two ply variety, where a substrate fabric material is adhered to a synthetic film membrane. Alternatively, they can be of the multi-ply variety, where an outer substrate fabric material is adhered to the remaining side of the synthetic film membrane, sandwiching the membrane between the traditionally produced laminates.

The laminates or separate sheets are placed in a parallel configuration with the center sheet being the thermoplastic film, with or without adhesive properties. These are then assembled by using a radio frequency welding process at the perimeter of the outer edge of the desired pattern of the article, outlining a specific form. The welded piece is then cut into the corresponding two or three dimensional form, which is the prefabricated component liner or a prefabricated stand-alone product. The form my be a glove, mitten, sock, shirt, boot/shoe, hat, jacket, pant and/or any other variations thereof. The prefabricated, multi-layered flexible product is then placed into a similarly configured outer prefabricated product by the use of positioning tabs which are then glued and/or sewn in place, and/or without the use of positioning tabs by placing adhesive at specific, strategic areas, i.e. in the fingers or cuff area to hold the two prefabricated pieces together. Alternatively, the prefabricated multi-layered flexible product can stand alone as a finished product.

Figure 1:
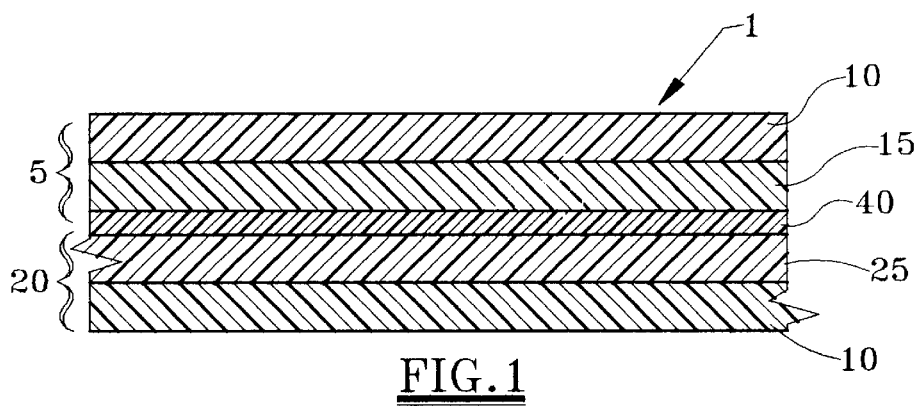
FIG. 1 is a cross sectional view of an embodiment of a two layer product of the present invention.
Figure 2:
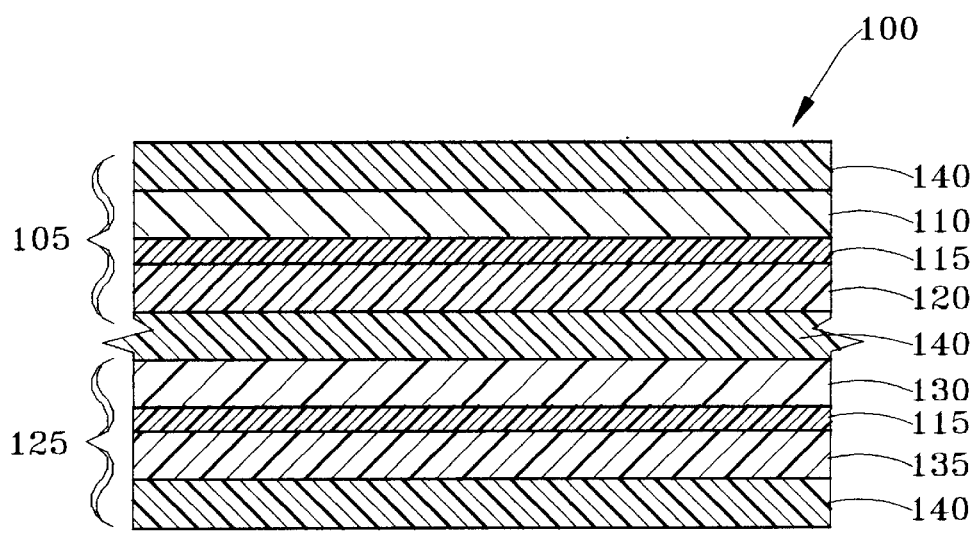
FIG. 2 is a cross sectional view of an embodiment of a multi layer product of the present invention.

Referring to FIGS. 1 and 2 there is shown a cross sectional view of a prefabricated two-layered flexible product 1 and a multi-layered flexible product 100, both being representative of the present invention. Referring specifically to FIG. 1, a first section 5 and a second section 20 each have a substrate fabric material layer 15 and 25, respectively, which lie parallel to a synthetic film membrane 10. First section 5 and second section 20 can either be laminates constructed via any conventional means or be separate sheets. Referring now specifically to FIG. 2, in a top section 105 an outer substrate fabric material 110 lies in parallel to a synthetic film membrane 115, which in turn lies parallel to a substrate fabric material 120. Similarly in a bottom section 125, an outer substrate fabric material 135 lies in parallel to a synthetic film membrane 115, which in turn lies parallel to a substrate fabric material 130. Other substrate fabric can provide protection and/or insulation for synthetic film membrane 115. It should be noted that the outer substrate fabric material and substrate fabric material used in top section 5 (105) can be different from bottom section 20 (125). This configuration is particularly applicable to fleece. For example, for substrate materials that have inherent wicking capabilities, i.e., fleece, the outer surface(s) of the weld areas must have a thermoplastic film placed on them (as in the inside) to insure a waterproof seal.

Substrate fabric material and outer substrate fabric material 15, 25, 110, 120, 130 and 135 may be woven or non-woven material that is either non-stretch or stretch and in turn hydrophobic or hydrophilic. These variations in choice of materials may allow the use of any of the following materials for substrate fabric material and outer substrate fabric material 15, 25, 110, 120, 130, and 135: woven non-stretch, woven two-way stretch, woven four-way stretch, non-woven non-stretch, non-woven two-way stretch, non-woven four-way stretch, woven non-stretch hydrophobic, woven non-stretch hydrophilic, woven two-way stretch hydrophilic, woven four-way stretch hydrophobic, woven four-way stretch hydrophilic, non-woven two-way stretch hydrophobic, non-woven two-way stretch hydrophilic, non-woven four-way stretch hydrophobic, and non-woven four-way stretch hydrophilic.

The synthetic film membrane 10 and 115 material may be waterproof, waterproof/breathable or windproof material that is either vapor permeable of non vapor permeable. Among the materials suitable for a synthetic film membrane 10 and 115 material are: waterproof vapor permeable homogenous polyurethane, waterproof vapor permeable homogenous polyolefin, waterproof non-vapor permeable homogenous polyurethane, waterproof non-vapor permeable homogenous polyolefin, waterproof/breathable vapor permeable homogenous polyurethane, waterproof/breathable vapor permeable homogenous polyolefin, waterproof/breathable non-vapor permeable homogenous polyurethane, waterproof/breathable non-vapor permeable homogenous polyolefin, windproof vapor permeable homogenous polyolefin, windproof non-vapor permeable homogenous polyurethane, windproof non-vapor permeable homogenous polyolefin.

Referring to both FIGS. 1 and 2, top section 5 (105) and bottom section 20 (125) are assembled using a radio frequency welding process to provide a leak proof seal at the perimeter of the outer edge of either substrate fabric material 15, 25, 120, and 130 and outer substrate fabric material 110 and 135. Although radio frequency processing has been used in the past, the combination of the heat and pressure has resulted in damaging the substrate fabric material and the outer substrate fabric material. This occurs because the heat and pressure results in crystallization of the material and the material thereafter breaks apart. As a consequence, prefabricated multi-layered flexible products do not exist. The present invention uses a thermoplastic film 40 (140), with or without adhesive properties, which aids in the bonding process within the weld area between the laminates or separate sheets. Thermoplastic film 40 (140), with or without adhesive properties, enhances the substrate fabric material's and other substrate fabric material's reactivity at lower temperatures. The film decreases the amount of heat and pressure needed to create the weld and thereby results in no damage to the multi-layered laminates. The film permits a single piece construction of the prefabricated multi-layered flexible product without the use of post-construction manufacturing techniques, such as sewing, gluing and/or taping. In addition, the laminating process can be eliminated by welding all of the materials together at the welded seams to form a prefabricated component liner or a prefabricated stand-alone product.

The thermoplastic joiner film is any suitable thermoplastic material such as polyurethane or polyolefin. The joiner film is preferably susceptible to RF heating, but non-RF-heatable films can also be suitably employed if used adjacent to an RF susceptible material and/or if preheating is used. The thickness of the joiner film will depend on its melting characteristics and the penetrability of the adjacent layer of the fabric substrate to be joined. For example, when the substrate is fleece or woven stretch nylon, a relatively thick joiner film is used to ensure penetration of the fleece or nylon layer to the membrane. The thicker the fabric substrate layers, the thicker the joiner film layer. On the other hand, when the joiner film is adjacent to the synthetic membrane it can be much thinner to achieve the required bonding. In any case, the joiner film is preferably compatible with the fabric substrate, and more preferably also compatible with the synthetic membrane and/or any tie layer which may be present between the fabric substrate and the membrane. If present, the tie layer should preferably be water-based and thermoplastic since solvent-based tie layers between the fabric and the membrane generally result in weaker bonds and thermoset tie layers will not flow to join with the joiner film. In FIGS. 1 and 2, the seams are shown as discrete layers, but it is understood that there will be a complete fusion between the layers and that the joiner film layer will penetrate any adjacent woven or non-woven fabric substrate layer.

Figure 3:
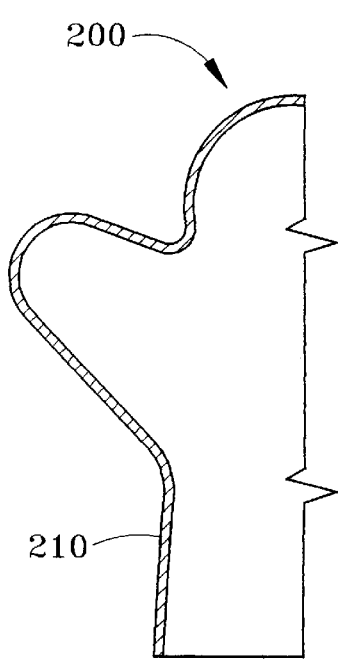
FIG. 3 is a partial view of a weld bar in accordance with the present invention.

Referring now also to FIG. 3, a weld bar 210 is shown for a mitten 200 constructed using the techniques described above and below. The weld bar 210 is placed on the overlaid fabric sections and joiner film and subjected to RF transmission for a sufficient time to melt the joiner film. If desired, pressure can also be applied between the weld bar 210 and an opposing platen (not shown) to facilitate penetration of the fabric by the molten joiner thermoplastic. The finished product is then allowed to cool and hand and/or die cut along the outside of weld bar 210 to finish the seam to within 1/32"–1/8". Excess thermoplastic film 40 (140), which was not used in the areas of the seams to be welded, is then removed, i.e. for a glove form there would exist an opening for the hand through which the remaining thermoplastic film would then be removed.

Figure 4:
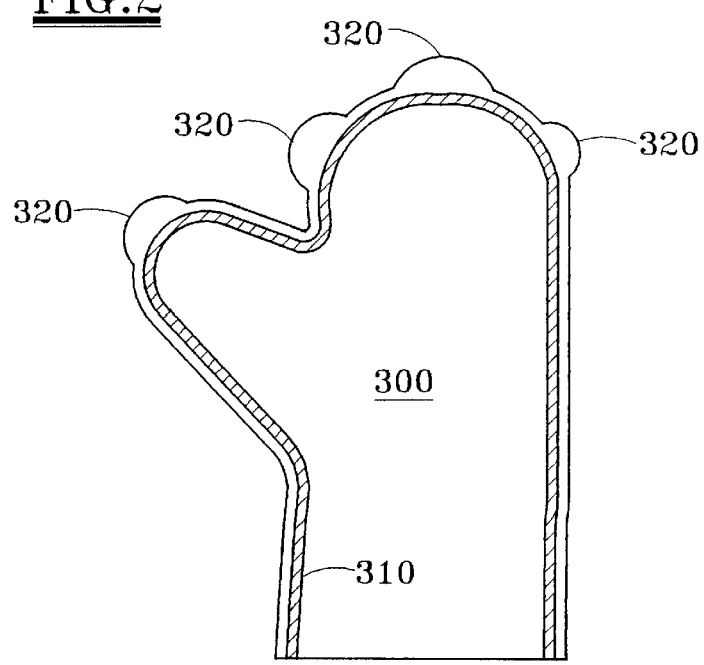
FIG. 4 is a schematic view of a mitten with positioning tabs in accordance with the present invention.

Referring now to FIG. 4, a glove 300 has a weld bar 310 and a set of sealed positioning tabs 320. Sealed positioning tabs 320 for the prefabricated component liner can be extended out from the welds to form sewing and/or alignment tab(s) at predetermined locations such as shoe eyelets and tongues, sleeve and leg cuffs, zippers, waist bands, etc., for achieving proper fit and position between the inner prefabricated component and an outer prefabricated product. In the case of prefabricated stand-alone products, the tab(s) 320 can be used to attach cuff(s), strap(s), zipper(s) and other such items.

Figure 5:
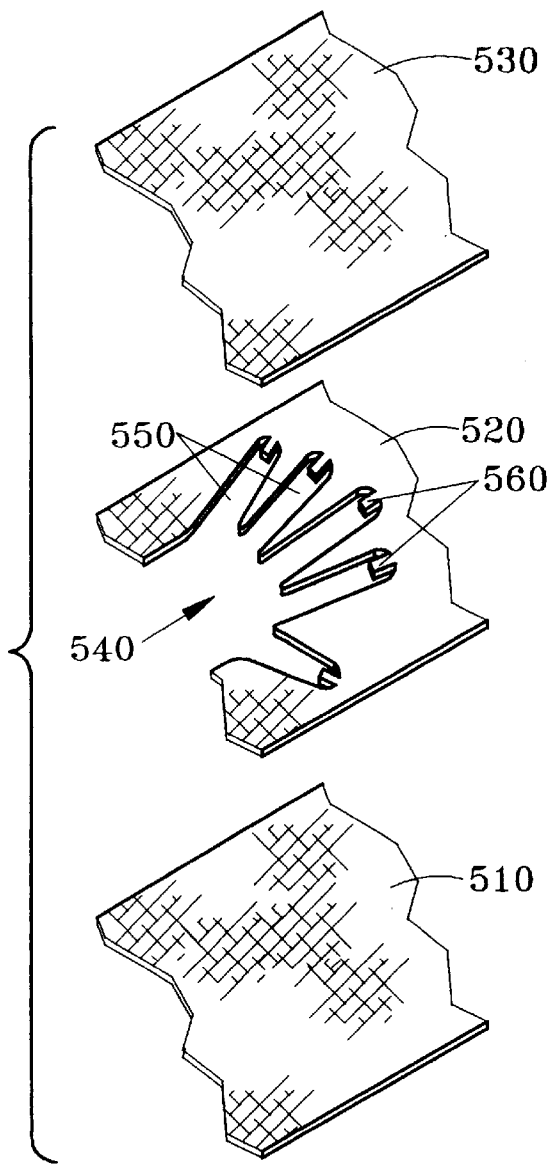
FIG. 5 is an exploded view of a glove assembly according to the present invention wherein outer fabric/membrane layers sandwich a precut thermoplastic film.
Figure 6:
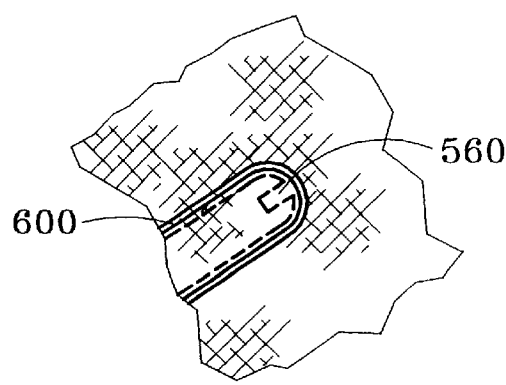
FIG. 6 is a plan view of the assembly of FIG. 5 after welding the outer fabric layers together with the intermediate joiner film.

With reference to FIGS. 5–8, there is shown a composite construction according to the various stages of manufacture. In FIG. 5, a bottom fabric section 510 is overlaid with a pre-cut thermoplastic joiner film 520 and upper fabric section 530. The thermoplastic joiner film 520 is pre-cut in the shape of a glove 540 with fingers 550. Tabs 560 are formed to extend inwardly into the shape of the fingers 550. If desired, holes (not shown) can be formed through each of the films 510, 520, and 530 to receive guide pins (not shown) for keeping the films 510, 520, and 530 in register with each other and the welding and/or cutting equipment. The overlaid films 510, 520 and 530 are welded in place to form seam 600 as best illustrated in FIG. 6. The tabs 560 formed in the joiner layer 520 thus extend inwardly of the seam 600.

Figure 7:
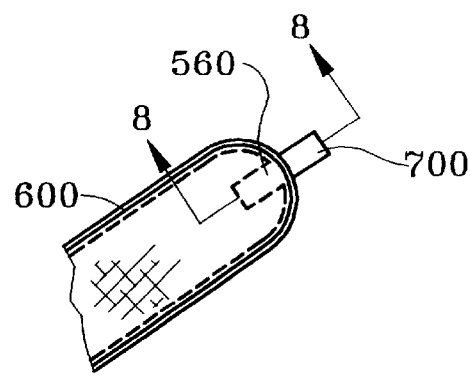
FIG. 7 is a plan view of the assembly of FIG. 6 after the excess fabric and joiner layers have been cut away from the seam to form outwardly extending tabs.
Figure 8:
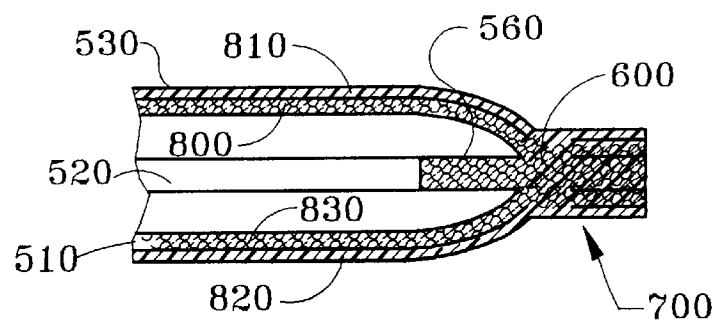
FIG. 8 is a cross sectional view of the assembly of FIG. 7 as seen along the lines 8—8.

Next, with reference to FIG. 7, the excess material is cut away to form an edge along the seam 600. The cutting is preferably by die stamping the glove, but manual cutting and/or tearing can also be employed. To form the tab 700, the excess material is cut away at a spacing away from the seam 600 in order to leave the tab 700 formed of the bottom fabric section 510, joiner layer 520 and top fabric section 530. See FIG. 8. The bottom section 510 and upper fabric section 530 are joined together with the joiner film 520 along the weld 600. Inner positioning tabs 560 extend inwardly from the seam 600 while the outer tab 700 extends outwardly from the seam 600. As shown in FIG. 8, the bottom section 510 can be a composite material formed of membrane layer 820 and fabric layer 830, while upper fabric section 530 can be formed of fabric section 800 and membrane layer 810.

EXAMPLE 1

A thermoplastic sheet was used as a joiner film between composite fabric layers according to the principles of the present invention. The joiner film was a 16 mil polyester aromatic polyurethane blown film having a Shore A hardness of 83, obtained from J.P. Stevens Elastomeric under the trade designation ST 1528-83A. Each composite fabric layer had an outer layer comprising 5.8 ounce/yard fleece obtained from Malden Mills as style 7431 navy POLARTECH with a DWR coating; a flame-laminated kiss polyurethane foam layer; a flame-laminated waterproof/breathable membrane obtained from Hub Fabric Leather Co., Inc. under the trade designation DURO TECH; and an inner layer of laminated 4.6 ounce/yard black polyester knit fabric obtained from Malden Mills as style 7504 black thermal knit.

The joiner film was die cut to remove the center portion of the sheet in the pattern of a glove having perimeter dimensions just inside the expected sewn perimeter line of the actual glove, but leaving a tab of material projecting inwardly at the tip of each finger toward the hand and wrist region of the glove. The tabs were sized and positioned to provide means within the seam that could be used for attaching an inner liner, i.e. inner tabs.

Two pieces were cut from the composite fabric layers in the shape of rectangles with dimensions just outside the greatest dimensions of the glove pattern. With the inner knit layers of the composite fabric layers facing each other, the die cut joiner film layer was positioned between the composite fabric layer rectangles by means of pins between the layers.

A radio frequency (RF) welding tool was fastened to the upper platen of a Thermatron 10 kw RF welding machine equipped with a 25-in. by 40-in. bed plate and a 20-in. by 30-in. upper heated platen. The RF welding tool was in proper registration with a foot fixture having the guide pins that register the fabric layers and joiner film directly underneath inside the press of the welding machine. The registration was such that the welding line of the tool followed the perimeter of the glove pattern, falling just outside the die cut shape of the joiner film, so that the welding captureeds just the edge of the joiner film between the opposite composite fabric layers.

The RF welding machine was turned on, the pre-seal time set to 3 seconds, the seal time set to 30 seconds, and the cool timer set to 8 seconds. The low pressure air on the 4-in. diameter cylinder of the RF welding machine was set to 125 psig and the power setting to 31.5 relative (on the high side of the power curve). The platen heater was off, allowing an upper platen temperature of 68° F. The ram adjustment was not set, allowing the upper platen to completely bottom out on the materials in the press.

The press cycle was initiated to close the press and allow the cycles through pre-seal, seal and cool. The press was opened to obtain the three layers welded in the shape of the glove pattern. The assembly was removed and moved to a clicker cutting device having a foot fixture that matched the foot fixture device used in the bottom or bed plate of the RF welding machine. The foot fixture of the clicker cutter had guide pins identical to those in the RF welding machine to maintain proper registration. A steel rule die having the shape of the glove was fastened to the upper platen of the clicker cutting tool. The line of the steel rule die followed the line of the RF welding tool except for tabs that extended outwardly from the hand region and the tips of the fingers, i.e. outer tabs. The clicker cutter was a standard 25 ton type designed to force the steel rule die through the material, cutting a line along the glove pattern, hitting the material in the middle of the weld (except at the outer tabs).

Once the material was registered with the clicker and the cutting tool, the press was closed and then opened to remove the two pieces. The waste was separated from the glove product. The glove product had inner tabs inside the end of each finger for attachment of a standard cotton or knit shell inside the glove, and outer tabs at the end of each finger and from the sides of the hand region for attachment of a standard leather shell.

EXAMPLE 2

Example 1 is repeated using an additional mesh type fabric with the joiner film to reinforce and strengthen the tabs. The seal time is increased to 40 seconds to allow additional time for the molten polyurethane to penetrate and flow through the additional mesh layer and bond with the composite fabric layers.

Obviously, numerous modifications and variations of the present invention are possible in light of the above teachings. For example, the synthetic film membrane material may be one of various thermoplastic resins suitable for use in place of polyurethane or polyolefin. It is therefore understood that within the scope of the appended claims, the invention may be practiced otherwise than as specifically described herein.

What is claimed is:

1. A method for producing a multi-layered flexible product, comprising the sequential steps of:
    (a) cutting out a thermoplastic joiner film along an inner edge of a pattern of a seam to be made with the joiner film;
    (b) positioning the joiner film between parallel top and bottom fabric sections;
    (c) welding the fabric sections and the joiner film together to form the seam along said pattern;
    (d) removing excess joiner film from along an outer edge of the seam.

2. The method of claim 1 wherein the cutting out step (a) forms a plurality of tabs which extend inwardly from the seam.

3. The method of claim 1 wherein the thermoplastic joiner film is selected from polyurethanes and polyolefins.

4. The method of claim 1 wherein the pattern is in a shape selected from gloves, glove inserts, mittens, socks, boots, booties, shoes, boot inserts, shoe inserts, jackets, coveralls, masks, waders, equipment covers, bags, tubes, pouches, shirts, pants and hats.

5. The method of claim 1 wherein each fabric section comprises a fabric substrate layer and a synthetic film membrane.

6. The method of claim 5 wherein the synthetic film membranes in each fabric section are fused adjacent the joiner film in said seam.

7. The method of claim 1 wherein the welding step (c) comprises RF welding.

8. The method of claim 1 wherein the welding step (c) and the step (d) of removing excess joiner film comprises tear seal welding.

9. The method of claim 1 wherein the welding step (c) and the step (d) of removing excess joiner film comprise trim bond welding.

10. The method of claim 1 wherein the step (d) of removing the excess joiner film comprises cutting along an outer edge of the seam.

11. The method of claim 10 wherein the cutting step (d) forms a plurality of tabs which extend outwardly of the seam.

12. A method for making an apparel insert comprising the steps of:
    (a) cutting out a thermoplastic joiner film along an inner edge of a pattern of a seam to be made with the joiner film, wherein the pattern includes a plurality of tabs which extend inwardly from the seam;
    (b) positioning the joiner film between parallel top and bottom fabric sections including a synthetic film membrane facing the joiner film and a fabric substrate layer away from the joiner film;
    (c) RF welding the fabric section and the joiner film together to form the seams along said pattern;
    (d) cutting away the fabric sections and joiner film from an outer edge of the seam to form a plurality of tabs which extend outwardly of the seam.

13. The method of claim 12 wherein the pattern is in the shape of a glove or mitten.

14. A method for making a glove, comprising the steps of
    (a) cutting out a thermoplastic joiner film along an inner edge of the glove pattern of a seam to be made with the joiner film, wherein the pattern includes a plurality of tabs which extend inwardly from the seam;
    (b) positioning the joiner film between parallel top and bottom fabric sections including a synthetic film membrane facing the joiner film and a fabric substrate layer away from the joiner film;
    (c) RF welding the fabric section and the joiner film together to form the seams along said pattern;
    (d) cutting away the fabric sections and joiner film from an outer edge of the seam to form a plurality of tabs which extend outwardly of the seam;
    (e) securing an inner glove liner to one set of the tabs; and
    (f) securing an outer glove shell to another set of the tabs.

* * * * *